(12) United States Patent
Biancardi et al.

(10) Patent No.: US 6,277,906 B1
(45) Date of Patent: Aug. 21, 2001

(54) FLUOROPOLYMER DISPERSIONS

(75) Inventors: Valerio Biancardi, Milan; Enrico Marchese, Asti; Fabio Polastri, Milan, all of (IT)

(73) Assignee: Ausimont S.p.A, Milan (IT)

( * ) Notice: Subject to any disclaimer, the term of this patent is extended or adjusted under 35 U.S.C. 154(b) by 0 days.

(21) Appl. No.: 09/705,699

(22) Filed: Nov. 6, 2000

Related U.S. Application Data

(62) Division of application No. 09/121,091, filed on Jul. 23, 1998, now Pat. No. 6,174,979.

(30) Foreign Application Priority Data

Jul. 25, 1997 (IT) .............................................. MI97A1767

(51) Int. Cl.⁷ .................................................. C08K 05/43
(52) U.S. Cl. .......................... 524/168; 524/220; 524/316; 524/317; 524/375; 524/545; 524/546
(58) Field of Search .................................. 524/168, 220, 524/316, 317, 375, 545, 546

(56) References Cited

U.S. PATENT DOCUMENTS

| | | | |
|---|---|---|---|
| 3,242,218 | 3/1966 | Miller | 260/615 |
| 3,644,492 | 2/1972 | Bartlett | 260/484 |
| 3,665,041 | 5/1972 | Sianesi et al. | 260/615 A |
| 3,715,378 | 2/1973 | Sianesi et al. | 260/463 |
| 4,013,698 | 3/1977 | Martini | 260/340.6 |
| 4,523,039 | 6/1985 | Lagow et al. | 568/615 |
| 4,675,380 | 6/1987 | Buckmaster et al. | 528/481 |
| 4,864,006 | 9/1989 | Giannetti et al. | 526/290 |
| 4,906,770 | 3/1990 | Marchionni et al. | 560/300 |
| 5,079,122 | 1/1992 | Bayley et al. | 430/160.6 |
| 5,144,092 | 9/1992 | Marraccini et al. | 568/615 |
| 5,176,943 | 1/1993 | Woo | 428/64 |
| 5,219,910 | 6/1993 | Stahl et al. | 524/236 |

FOREIGN PATENT DOCUMENTS

| | | |
|---|---|---|
| 0 075 312 A2 | 3/1983 | (EP) . |
| 0 148 482 A2 | 7/1985 | (EP) . |
| 0 247 379 A1 | 12/1987 | (EP) . |
| 0 280 312 A2 | 8/1988 | (EP) . |
| 0 539 043 | 4/1993 | (EP) . |
| 0 818 490 | 1/1998 | (EP) . |
| 1104482 | 2/1968 | (GB) . |
| 1106344 | 3/1968 | (GB) . |
| WO 96/30445 | 10/1996 | (WO) . |

*Primary Examiner*—Helen L. Pezzuto
(74) *Attorney, Agent, or Firm*—Arent Fox Kintner Plotkin & Kahn PLLC

(57) ABSTRACT

Fluoropolymer aqueous dispersions comprising an hydrogenated nonionic surfactant and a fluorinated nonionic surfactant selected from the following classes:

$$R_f-L-(OCH(R_1)-CH(R_2))_n-O-A \qquad (I)$$

wherein:

n is an integer comprised between 4 and 60;

L is selected from:
  $-(CF(Y)-CO-O)_p R'-$; $-(CF(Y)-CO-NH)_p R'-$; $-(CF(Y)-SO_2-NH)_p R'-$;
  wherein: p is 0 or 1; Y can be F or $CF_3$; R' is an alkylic radical $C_1-C_5$;

$R_1$, $R_2$ can preferably be both H or the former H and the latter $CH_3$, $R_f$ can be a radical of (per)fluoroalkane type from 4 to 20 C atoms or of (per)fluoropolyether type;

A is selected from the following ones:
  $-H$; $-CH$, $-CH_2OH$; $-CH_2OCH_2CH_2OH$; $-CH_2(OCH_2CH_2)_{n'''}OR'$ wherein $n'''$ is an integer between 2 and 15 and R' is H, $CH_3$, $COCH_3$; $-CONHCH_2CH_2OH$.

9 Claims, No Drawings

FLUOROPOLYMER DISPERSIONS

This application is a Divisional application of U.S. Ser. No. 09/121,091, filed Jul. 23, 1998 now U.S. Pat. No. 6,174,979.

The present invention relates to fluoropolymer dispersions suitable for the cloths impregnation and the obtainment of cast films.

More particularly it relates to fluoropolymer dispersions having improved substratum wetting, i.e. with reduced presence of cissings, and minimum viscosity variation with temperature and critical thickness maintenance, necessary condition to obtain coatings of high thickness and free from cracks with few passages. Moreover the formulations obtainable from the fluoropolymer dispersions of the present invention are such to minimize the discoloration problems of the manufactured article.

It is known that the fluoropolymer dispersions and of PTFE in particular, are used to impregnate cloths and to coat supports able to thermally withstand to the sintering treatment that the fluoropolymer must undergo to form a continuous film. A particular case is formed by PTFE cast films, obtained by successive deposition of PTFE films brought to sintering and then removed from the support.

The use of fluoropolymer dispersions for the cloth coating (glass fiber, KEVLAR, etc.) and for obtaining films has been known for a long time.

One of the problems arising during the use of the fluoropolymer aqueous dispersions for the above purposes consists in assuring a very good and homogeneous covering of the support to be coated with the fluoropolymer. The greatest problems arise when a first layer of fluoropolymer has been deposited on the support and one has to continue to deposit fluoropolymer aqueous dispersion on the first fluorinated layer having low surface energy (for instance for the PTFE γ is about 17 dyne/cm).

Another problem is to avoid that the fluoropolymer dispersion viscosity has a great dependence on the temperature in the range 10°–50° C., preferably 20°–35° C. Indeed the temperature of the bath where the dispersion is placed can vary in this range during the deposition process, with negative consequences for the control of the impregnation process of the cloths or of the cast film formation. In general it is preferable that the viscosity absolute value of the formulated dispersion in this temperature range is not higher than 150–200 cPoise, preferably not higher than 100 cPoise, still more preferably lower than 60 cPoise. Industrial processes generally operate continuously and the drying and sintering conditions are fixed at the beginning. A variation of the dispersion viscosity during the time, involving a pick-up variation (amount of deposited dispersion) would oblige to a continuous adjustment of the initial drying and sintering conditions. This way to operate is not suitable from an industrial point of view. On the other hand if these continuous adjustements are not carried out, the quality of the final coating is very poor and besides it does not maintain constant during the time.

A further problem is to have a high critical thickness of the formulated dispersion to allow to deposit high dispersion thicknesses without the formation, during the sintering, of cracks and pinholes which lower the sealing and protection capability of the coating. A further charateristic which it is desirable not to be meaningfully modified is the colour of the final manufactured article, in particular of the cast films obtainable from the dispersions.

To solve these technical problems it is known in the art to use dispersions containing surfactants.

However the fluoropolymer dispersions usually commercialized, are not able of contemporaneously solving all the mentioned problems.

For instance polytetrafluoroethylene (PTFE) dispersions containing about 60% by weight of PTFE and containing as surfactant TRITON® X100, alkylphenoxyethoxylated surfactant commonly used, in an amount of 3% by weight, are not able to give coatings on cloths usable from the industrial point of view since the cloths contain cissings, i.e. zones not homogeneously coated.

Therefore the use of these cloths for instance in the foodsector is not possible since in these zones they do not show the desired antisticking characteristics.

Other used PTFE-based dispersions, which contain besides TRITON® X100 also other alkylphenoxyethoxylates, give a wetting increase but they introduce discoloration problems and viscosity increase.

The Applicant has unexpectedly and surprisingly found that it is possible to prepare fluoropolymer dispersions capable to overcome all the above technical problems.

It is an object of the present invention fluoropolymers aqueous dispersions comprising:

a) 1 to 10% of an hydrogenated nonionic surfactant;
b) 0.1 to 3% by weight of a fluorinated nonionic surfactant selected from the following classes:

$$R_f—L—(OCH(R_1)—CH(R_2))_n—O—A \qquad (I)$$

wherein:

n is an integer in the range 4–60, preferably 8–30;
L is selected from:
—(CF(Y)—CO—O)$_p$R'—; —(CF(Y)—CO—NH)$_p$R'—; —(CF(Y)—SO$_2$—NH)$_p$R'—;
wherein: p is 0 or 1; Y can be F or CF$_3$; R' is an alkylic radical C$_1$–C$_5$, linear or branched when possible;
R$_1$, R$_2$ can preferably be both H or the former H and the latter CH$_3$,
R$_f$ can be a radical of (per)fluoroalkane type from 4 to 20 C atoms or of (per)fluoropolyether type comprising repeating units randomly distributed along the polymer chain selected from:
—CF(X)CF$_2$O— or —CFXO—, wherein X is equal to F or —CF$_3$; —CF$_2$(CF$_2$)$_z$O—wherein z is an integer equal to 2 or 3; —CF$_2$CF(OR$_f$")O— or —CF(OR$_f$")O— wherein R$_f$ ' can be —CF$_3$', —C$_2$F$_5$, or —C$_3$F$_7$;
A is selected from the following ones:
—H; —CH$_1$—CH$_2$OH; —CH$_2$OCH$_2$CH$_2$OH; —CH$_2$(OCH$_2$CH$_2$)$_{n'''}$OR' wherein n''' is an integer in the range 2–15 and R' is H, CH$_3$, COCH$_3$; —CONHCH$_2$CH$_2$OH;

c) 25 to 75% by weight of water.

The R$_f$ radical generally has a number average molecular weight from 250 to 1500, preferably from 400 to 1000.

The perfluoropolyether radicals R$_f$ comprise a T end group selected from —CF$_3$, —C$_2$F$_5$, —C$_3$F$_7$, ClCF$_2$CF (CF$_3$)—, CF$_3$CFClCF$_2$—, ClCF$_2$CF$_2$ —and ClCF$_2$—.

In particular the following prfluoropolyether radicals R$_f$ can be mentioned as preferred:

(a) T—O (CF$_2$CF(CF$_3$)O)$_a$(CFXO)$_b$— wherein: X is F or CF$_3$; a and b are integers such that the molecular weight is in the above range; a/b is in the range 10–100 when b is different from 0, and T is one of the above mentioned end groups;

(b) T—O(CF$_2$CF$_2$O)$_c$(CF$_2$O)$_d$(CF$_2$(CF$_2$)$_z$CF$_2$O)$_h$ — wherein: c, d and h are integers such that the molecular weight is in the above range; c/d is in the range 0.1–10; h/(c+d) is in the range 0–0.05, z is an integer equal to 2 or 3, and T is one of the above mentioned end groups;

(c) T—O(CF$_2$CF(CF$_3$)O)$_e$(CF$_2$CF$_2$O)$_f$(CFXO)$_g$ — wherein: x is F or CF$_3$; e, f, g are integers such that the molecular weight is in the above range; e/(f+g) is in the range 0.1–10, f/g is in the range 2–10, T is one of the above mentioned end groups;

(d) T—O(CF$_2$O)$_j$(CF$_2$CF(OR$_f$")O)$_k$(CF(OR$_f$")O)$_l$— wherein: R$_f$" is —CF$_3$, —C$_2$F$_5$, —C$_3$F$_7$; j,k,l are integers such that the molecular weight is in the above range; k+l and j+k+l are at least equal to 2, k/(j+l) is in the range 0.01–1000, l/j is in the range 0.01–100; T is one of the above mentioned end groups;

(e) T—O—(CF$_2$(CF$_2$)$_z$CF$_2$O)$_s$ — wherein s is an intger such as to give the molecular weight above indicated, z has the above meaning and T is one of the above mentioned end groups;

(f) T—O (CR$_4$R$_5$CF$_2$CF$_2$O)$_{j'}$— wherein R$_4$ and R$_5$ are equal to or different from each other and selected from H, Cl or perfluoroalkyl, for instance having 1–4 C atoms, j' being an integer such that the molecular weight is that above indicated;

(g) T—O (CF(CF$_3$)CF$_2$O)$_{j''}$— j" being an integer such as to give the moelcular weight above indicated.

These compounds and the methods for their preparation are described in GB 1,104,482, U.S. Pat. Nos. 3,242,218, 3,665,041, 3,715,378 and 3,665,041, EP 148,482 and U.S. Pat. Nos. 4,523,039, 5,144,092.

The preferred nonionic surfactants of formula (I) are those in which L=CH$_2$—CH$_2$; n ranges from 8 to 12, R$_1$=R$_2$=H; R$_f$ is a pefluoroalkyl from 5 to 10 carbon atoms, preferably from 6 to 8.

The preferred perfluoropolyether radicals of the present invention have the following structures:

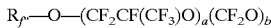

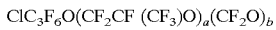

wherein a and b are such that the molecular weight ranges from 500 to 800, and R$_{f''}$ has the above meaning.

Preferably the amount of the component b) is in the range 0.15–2% by weight, the component c) is preferably in the range 35–55%.

The component a) can also be a mixture of two or more nonionic hydrogenated surfactants. For instance the following classes can be mentioned: -alkylphenoxypolyethoxylates having a different ratio between alkylic- and ethoxylic segment wherein the alkyl segment ranges from 6 to 15 carbon atoms and the ethoxylic segment ranges from 4 to 20 ethoxylic units; for instance octylphenoxyethoxylate is mentioned in which the ethoxy group generally consists of 10 units (commercial product TRITON® X100); or the nonylphenoxyethoxylate in which the ethoxy group generally shows nine units, (commercial product RIOKLEN® NF8); -polyethoxylated aliphatic alcohols in which by aliphatic it is meant an alkylic chain from 5 to 20 carbon atoms and the ethoxylated segment generally has from 4 to 20 ethoxylic units (as reported in the Patent Application WO 96/30445), -alkyl substituted oxidized amines (see for instance U.S. Pat. No. 5,219,910).

The component b) can be used mixed with anionic fluorinated surfactants; perfluorocarboxylic acid salts from 5 to 11 carbon atoms, for instance amonium perfluorooctanoate; perfluorosulphonic acid salts from 5 to 11 carbon atoms; mono and bi carboxylic acid salts derived from perfluoropolyethers can be mentioned; the ratio by weight between nonionic and anionic surfactants ranges from 0.1 to 10, preferably from 0.5 to 2.

Among the fluoropolymers, polytetrafluorcethylene or tetrafluoroethylene copolymers can be mentioned. In particular, as TFE copolymers, the following ones can be mentioned:

A) modified polytetrafluoroethylene containing small amounts, generally in the range 0.01–3% by moles, preferably in the range 0.05–0.5% by moles, of one or more comonomers such as, for instance, perfluoropropene, perfluoroalkylperfluorovinylethers, vinylidene fluoride, hexafluoroisobutene, chlorotrifluoroethylene, perfluoroalkylethylenes;

B) tetrafluoroethylene (TFE) thermoplastic copolymers containing from 0.5 to 8% by moles of at least a perfluoroalkylvinylether, where the perfluoroalkylic radical has from 1 to 6 carbon atoms, such as for instance, TFE/perfluoropropylvinylether, TFE/perfluoromethylvinylether, TFE/perfluoroethylvinylether, TFE/perfluoroalkylethylene copolymers; alternatively to perfluoroalkylvinylether it can be used a fluorodioxole, preferably as defined hereinafter in D) 3); TFE amorphous copolymers with fluorodioxoles, preferably as defined below, the amount of fluorodioxole can range from 40 to 95% by moles;

C) tetrafluoroethylene thermoplastic copolymers containing from 2 to 20% by moles of a perfluoroolefin C$_3$–C$_8$, such as for instance the TFE/hexafluoropropene copolymer, to which small amounts (lower than 5% by moles) of other comonomers having a perfluorovinylether structure can be added (as described for instance in the U.S. Pat. No. 4,675,380);

D) tetrafluoroetilene thermoplastic copolymers containing from 0.5 to 13% by weight of perfluoromethylvinylether and from 0.05 to 5% by weight of one or more fluorinated monomers selected in the group formed by:

1)

wherein R$_F$ can be:
i) a perfluoroalkylic radical containing from 2 to 12 carbon atoms;
ii)

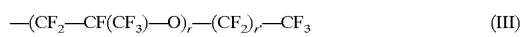

wherein r is in the range 1–4 and r' is zero or in the range 1–3;
iii)

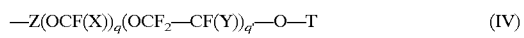

wherein the (OCFX) and (OCF$_2$—CFY) units are randomly distributed along the chain; T, X and Y have the same meaning previously defined; Z represents —(CFX)— or —(CF$_2$—CFY)—;
q and q', equal to or different from each other, are zero or integers in the range 1–10; the average number molecular weight of the monomer is in the range 200–2,000.

iv)

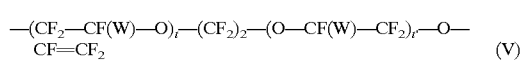

wherein w is —Cl, —F or —CF$_3$ and t and t'are zero or integers in the range 1–5;

v)

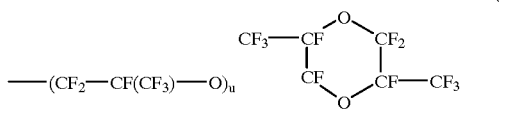

wherein u is zero or an integer in the range 1–4;
2)

wherein $R_f$ has the meaning described in 1);
3) a perfluporodioxole of formula:

wherein $R_3$ is a perfluoroalkyl radical $C_1$–$C_5$; $X_1$ and $X_2$ are, independently from each other, a fluorine atom or —$CF_3$, both $X_1$ and $X_2$ are preferably fluorine atoms.

The preferred weight ratio of the three classes of monomers forming the thermoplastic copolymers tetrafluoroethylene/perfluoromethylvinylether/fluorinated monomers (D) is the following:
perfluoromethylvinylether: 2–9%;
fluorinated monomers: 0.1–1.5%;
tetrafluoroethylene: complement to 100%.

Among the comonomers of formula (II), perfluoroethylvinylether, perfluoropropylvinylether and perfluorobutylvinylether can for instance be mentioned. The preferred comonomer of this class is the perfluoropropylvinylether.

The comonomers of formula (III) are described, for instance, in the published European Patent Application No. 75,312. Examples of these comonomers are those in which r can be 1 or 2 and r' is 2.

The comonomers of formula (IV) are obtained by dechlorination of the compounds of formula:

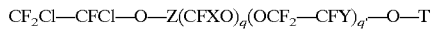

which can be prepared as described in Example 11 of U.S. Pat. No. 4,906,770.

The comonomers of the class (V) can be prepared according to the procedures described in the British Patent 1,106,344. Among these comonomers the compound:

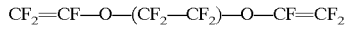

can be mentioned.

The comonomers of the class (VI) can be prepared according to the procedures described in U.S. Pat. No. 4,013,689.

In the comonomers of formula (VII) $R_F$—CH=$CH_2$, the radical $R_F$ preferably contains from 2 to 6 carbon atoms. Examples of these comonomers are perfluorobutylethylene and perfluorohexylethylene.

The fluorinated comonomers 1–3 above described can be copolymerized with pure TFE and perfluoromethylvinylether to give terpolymers or in combination among each other to give tetrapolymers or copolymers having a higher constituent complexity.

The tetrafluoroethylene copolymers can be prepared by radical polymerization in aqueous medium. It is particularly suitable to carry out the polymerization in aqueous phase according to the European Patent Application No. 247,379, or as described in the U.S. Pat. No. 4,864,006.

The concentration of the obtained latex by polymerization is generally in the range 20–50% by weight and its viscosity is typically of few centipoises, such as for instance 5–10 centipoises.

The latex can be further concetrated by means of the prior art techniques, for instance by using conventional nonionic surfactants, such as for instance octylphenoxypolyethoxyethanol, known on the market with the commercial name of Triton® X 100 commercialized by Union Carbide.

The results obtained with the present invention dispersions are unexpected and surprising since:

not all the surfactants which lower the aqueous solution surface tension allow to reach the indicated property combination;

the noticed lowering, of the invention dispersion surface tension is minimum, it is not such as to be considered the wetting cause and it is not correlated to the application test success;

some known surfactants cause an undesirable variation of the dispersion viscosity or they must be added in high amounts, giving discoloration phenomena during the fluoropolymer sintering phase;

high critical thicknesses without the presence of cracks are obtained.

The following examples are given for illustrative purposes but are not limitative of the invention.

EXAMPLES

Characterization Methods Used in Examples 1–5
Polymer and Surfactant Titre

In 3 aluminum capsules previously weighed, 1–2 g of dispersion are weighed. Then the samples are dried for 2 hours at the temperture of 105±1° C. They are allowed to cool up to room temperature in a drier and are weighed. Then the surfactant is evaporated by sintering, in an oven at 400±5° C. for 3 minutes.

In order to calculate the surfactant and polymer percentage the following equations are used:

% polymer=G/C·100=(E-A)/(B-A)·100

% surfactant=G/C·100=(D-E)/(B-A)·100 wherein the symbols have the following meanings (weight by grams):
A=aluminum capsule weight
B=capsule weight+product weight
C=used product weight
D=capsule weight+product after drying
E=capsule weight+product after sintering
F=surfactant weight
G=polymer weight.
The average value of 3 weighings is used.
Surface Tension A KRUSS type tensiometer with platinum ring and glass weighing bottle is used.

The platinum ring is cleaned by first dipping it in concentrated HCl and then drying it with oxidizing flame. The operation is repeated until the ring exposed to the flame makes it no longer coloured.

The instrument is calibrated according to the manufacturer instructions.

About 50 ml of the supernatant layer obtained by centrifugation of the dispersion are introduced at the temperature of 25° C., in a suitable capacity and well cleaned weighing bottle and then it is laid on the tensiometer mobile support.

The ring is applied to the instrument after it has been cleaned. The support is raised until the ring is immersed in the liquid for about 5 mm, at this point the instrument is set at zero with the ring dipped with the upper part in contact with the surface. The support is slowly lowered, by increasing the bending force by a knob, so as to maintain the indicator on the ring-holder bending arm at the zero value. One continues up to the detachment of the ring from the film of the tested liquid.

The reading of the K max bending force is carried out on the ring nut disk around the bending knob; the surface tension is calculated with the following equation:

K max/Lb·F=surface tension (dyne/cm)

K max=maximum strength (dyne)

Lb=wet length (double circumference of the ring)(cm)

F=correction factor

Lb is known: it is given by the ring configuration.

K max is measured.

Brookfield Viscosity

A Brookfield viscometer RVT model is used, equipped with sampling thief No. 1 (gamma 2–400 Centipoises -cP) and a thermostatic bath.

The thermostat is heated up to the temperature of 20±0.2° C. A 400 ml glass beaker, containing 350 ml of the dispersion to be tested, is put into the thermostatic bath and conditioned for a time of 2 hours. At the end of the thermostating time, the sampling thief is dipped into the dispersion to be examined up to the level marked on the sampling thief. The viscometer is turned on and the rotation speed is regulated at 20 rpm; the sampling thief is allowed to rotate until the read value becomes constant; at this point the clutch is lowered and the motor is stopped so that when the motor is stopped the index is visible. The read value is recorded. The thermostat is positioned at 35±0.20° C. and the same operations are repeated.

The apparent viscosity is calculated as:

η=LS·K·f wherein:
LS=reading carried out on the instrument
K=conversion factor specific of the used sampling thief
f=calibration factor of the instrument.
Critical Thickness A feeler Permascope EC by Fischer, a Sfeat sintering oven and aluminum specimen having sizes 200×100 mm are used.

The dispersion is filtered with 280 mesh nylon net. 50 ml of dispersion are spread on the specimen (previously degreased with toluene and acetone) by keeping it inclined of about 45°, this produces a film with variable thicknesses. It is dried in air by maintaining the specimen inclined of about 60°. Then it is sinterized in an oven at 400° C. for 3 minutes and then cooled in air.

By optical 60× miscroscope the zone in which there are no cracks is found by scratching and lifting the film with a metal tip. The thickness measurements are carried out near the considered zone. The value of the critical thickness is expressed in micron.

Example 1

A PTFE dispersion in water at 60% of PTFE, 3% Triton® X100 (component a)) corresponding to the commercial product Algoflon® D60/A by AUSIMONT, is charged with 0.32% of component b) Forafac® 1110D produced by ELF ATOCHEM. The dispersion is homogenized on a jar rotor for 60 min and then let rest for at least 12 h.

A sample is taken on which the viscosity at different temperatures, the surface tension at room temperature and the critical thickness of the dispersion are determined (Example 1 of the Table).

Said dispersion is then used to impregnate glass cloth 116 type, 100 micron thickness, by using a vertical type impregnator having faced squeezing rolls. Six subsequent cloth impregnation treatment are carried out, with rising dry product concentration: 30, 40, 50, 60%. At each passage it is visually controlled that the dispersion covering/wetting on the cloth tape is homogeneous. This is classified as wettability, in a scale from 1 to 3 (1=cissings absent; 2=cissings present in limited amounts and sizes; 3=cissings present in remarkable amounts and sizes). According to the present invention only the value 1 in the scale of the cissings is acceptable.

The defect corresponding to a not good tape wetting is said cissing and involves a coating dishomogeneity which can compromise the use thereof. It is known that, from this point of view, the passages involving the deposition on the cloth already covered with PTFE are critical. At the end, after the sixth impregnation treatment, a tape free from cissings is obtained.

From this example it results that the component b) allows to obtain a good wettability without viscosity increase and colour worsening of the final manufactured article.

Example 2 (comparative)

Example 1 is repeated but using the dispersion of Algoflon D60/A (60% PTFE, 3% Triton® X100) without the addition of the component b).

A cloth is obtained which is not suitable to be used due to the massive presence of wetting defects.

From this Example it is noticed that without the component b) the dispersion is not capable of effectively wetting the substratum, even though the surface tension of the supernatant layer is very close to that of the formulated dispersion of Example 1.

Example 3 (comparative)

The dispersion of Example 2 (60% PTFE, 3% Triton® X100) is charged with 0.2% of ammoniumperfluorooctanoate (PFOA).

One proceeds as in Example 1 for the dispersion homogenization and the carrying out of the impregnation test.

The obtained tape shows a cissing value=2 but the viscosity shown by the formulated dispersion is high for the normal deposition conditions.

Example 4 (comparative)

The dispersion of Example 2 (60% PTFE, 3% Triton® X100), ia charged with 0.4% of ammoniumperfluorooctanoate (PFOA).

One proceeds as in Example 1 for the dispersion homogenization and the carrying out of the impregnation test.

The viscosity is remarkably increased in comparison with that of Example 3.

From this example and from the previous one it is noticed that the PFOA is a surfactant adequate to improve the wettability of the dispersion towards the substratum but it gives an undesired viscosity increase.

Example 5 (comparative)

The dispersion of Example 2 is charged with Rioklen® NF8 up to a total content of the two surfactants equal to 3.8% with a ratio equal to 60/40 of Triton® X100/Rioklen® NF8. One proceeds as in Example 1 for the dispersion homogenization and the carrying out of the impregnation test.

The dispersion performance is good from the wettability point of view but the viscosity of the formulated dispersion is high and the total content of surfactant is high too: indeed the colour of the impregnated tape is browner than in the previous cases, colour=3. (colour scale from 1 to 3: 1=optimal (clear); 2=sufficient; 3=unsufficient).

In this case it happens that also an hydrogenated nonionic surfactant such as Rioklen is able to improve the dispersion wettability, but it must be added in such amounts as to become a problem for the dispersion viscosity control and to cause colouring problems for the impregnated cloth.

Example 6

The dispersion of Example 2 (60% PTFE, 3% of TRITON® X100), is charged with ammoniumperfluorooctanoate 0.15%, Forafac 1110D 0.15%, up to a surfactant total content equal to 3.3%.

One proceeds as in Example 1 for the homogenization of the dispersion and the carrying out of the impregnation test.

The obtained tape is free from defects, the viscosity of the formulated dispersion is in the acceptability range for these applications and the tape colour is evaluated 1.

Example 7

The dispersion of Example 2 (60% PTFE, 3% of TRITON® X100), is charged with 0.5% of component b) fluorinated surfactant having formula (IX): —ClC$_3$F$_6$O(CF$_2$CF(CF$_3$)O)$_a$(CF$_2$O)$_b$—(CF$_2$CONH)—(CH(CH$_3$)CH$_2$)—(OCH$_2$—CH$_2$)$_{22}$—O—CH$_3$ wherein the number average molecular weight is 1700, up to a total content of surfactnts equal to 3.5%. One proceeds as in Example 1 for the dispersion homogeneization and the carrying out of the impregnation test.

Results and characteristics of the formulated dispersion similar to those of Example 1 are obtained.

Example 8

The dispersion of Example 2 (PTFE 60%, 3% of TRITON® X100), is charged with ammonium salt of surfactant having the formula:

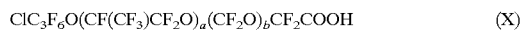

$$ClC_3F_6O(CF(CF_3)CF_2O)_a(CF_2O)_bCF_2COOH \qquad (X)$$

having number average molecular weight equal to 485 (anionic surfactant) in amount of 0.15%; of the fluorinated nonionic surfactant of Example 7 in amount of 0.15% by weight; so as to have a total content of surfactant equal to 3.3% by weight.

One proceeds as in Example 1 for the dispersion homogeneization and the carrying out of the impregnation test.

The obtained tape is free from defects and the viscosity is acceptable.

Example 9 (comparative)

Example 3 is repeated but using instead of TRITON® X100 a nonionic surfactant of the polyethoxylated aliphatic alcohols class (Rhodasurf® 870 H20 by Rhone Poulenc).

The results are similar to those of Example 3.

Example 10

Example 6 is repeated but using instead of TRITON® X100 a nonionic surfactant of the polyethoxylated alipahtic alcohols class (Rhodasurf® 870 H20 by Rhone Poulenc).

The results are similar to those of Example 6. The results of the various Examples are reported in the Table.

TABLE

| EX | PTFE (%) | Comp.a) (%) | Comp.b) (%) | Brookfield Viscosity (cPoise) 20° C. | 25° C. | 30° C. | 35° C. | Surf. Tens. (dyne/cm) | Crit. Thickness | Application Test Ciasings | Colour |
|---|---|---|---|---|---|---|---|---|---|---|---|
| 1 | (60.0) | Triton ® X100 (3.0) | Porafac 1110D (0.32) | 25 | 22 | 22 | 22 | 29.6 | 4 | 1 | 1 |
| 2 comp | (60.0) | Triton ® X100 (3.0) | — | 25 | 19 | 26 | 23 | 31.7 | 4 | 3 | 1 |
| 3 comp | (60.0) | Triton ® X100 (3.0) | PFOA (0.2) | 37 | 98 | 158 | 162 | 32 | 8 | 2 | 1 |
| 4 comp | (60.0) | Triton ® X100 (3.0) | PFOA (0.4) | 180 | 185 | 205 | 215 | 32 | cracks | 1 | 1 |
| 5 comp | (60.0) | Triton ® X100 (2.3) | Rioklen ® NF8 (1.5) | 32 | 75 | 128 | 155 | 34 | 15 | 1 | 3 |
| 6 | (60.0) | Triton ® X100 (3.3) | PFOA (0.15) Porafac 1110D (0.15) | 25 | 23 | 23 | 20 | 29 | 10 | 1 | 1 |
| 7 | (60.0) | Triton ® X100 (3.0) | IX (0.5) | 30 | 28 | 27 | 27 | 33.5 | 8 | 1 | 2 |
| 8 | (60.0) | Triton ® X100 (3.0) | X (0.15) IX (0.15) | 28 | 30 | 30 | 50 | 28 | 10 | 1 | 1 |
| 9 comp | (60.0) | Rhodasurf ® 870 H 20 (3.0) | PFOA (0.2) | 32 | 26 | 26 | 25 | 32 | cracks | 2 | 1 |

TABLE-continued

| EX | PTFE (%) | Comp.a) (%) | Comp.b) (%) | Brookfield Viscosity (cPoise) | | | | Surf. Tens. (dyne/cm) | Crit. Thickness | Application Test | |
| | | | | 20° C. | 25° C. | 30° C. | 35° C. | | | Ciasings | Colour |
|---|---|---|---|---|---|---|---|---|---|---|---|
| 10 | (60.0) | Rhodasurf ® 870 H 20 (3.0) | PFOA (0.15) Porafac 1110D (0.15) | 35 | 30 | 25 | 25 | 31 | 5 | 1 | 1 |

What is claimed is:

1. Fluoropolymer aqueous dispersions comprising:
   a) 1 to 10% of an hydrogenated nonionic surfactant;
   b) 0.1 to 3% by weight of a fluorinated nonionic surfactant selected from the following:

$$R_f-L-(OCH(R_1)-CH(R_2))_n-O-A \qquad (I)$$

wherein:
n is an integer in the range 4–60;
L is selected from:
   $-(CF(Y)-CO-O)_pR'-$; $-(CF(Y)-CO-NH)_pR'-$; $-CF(Y)-SO_2-NH)_pR'-$;
wherein: p is 0 or 1; Y can be F or $CF_3$; R' is a linear or branched alkylic radical $C_1-C_5$;
$R_1$, $R_2$ are both H or the former is H and the latter $CH_3$, $R_f$ is a (per)fluoroalkyl radical from 4 to 20 carbon atoms or a (per)fluoropolyether radical comprising repeating units randomly distributed along the polymer chain selected from:
   $-CF(X)CF_2O-$ or $-CFXO-$, wherein X is equal to F or $-CF_3$; $-CF_2(CF_2)_zO-$ wherein z is an integer equal to 2 or 3; $-CF_2CF(OR_{f'})O-$ or $-CF(OR_{f'})O-$ wherein $R_{f'}$ can be $-CF_3$, $-C_2F_5$, or $-C_3F_7$;
A is selected from the following:
   $-H$; $-CH$; $-CH_2OH$; $-CH_2OCH_2CH_2OH$; $-CH_2(OCH_2CH_2)_{n'''}OR'$ wherein n''' is an integer in the range 2–15 and R' is H, $-CH_3$, $-COCH_3$; $-CONHCH_2CH_2OH$; and
   c) 25 to 75% by weight of water.

2. Dispersions according to claim 1 wherein $R_f$ has number average molecular weight in the range 250–1500.

3. Dispersions according to claim 1 wherein the perfluoropolyether radicals $R_f$ comprise a T end group selected from $-CF_3$, $-C_2F_5$, $-C_3F_7$, $ClCF_2CF(CF_3)-$, $CF_3CFClCF_2-$, $ClCF_2CF_3-$ and $ClCF_2-$.

4. Dispersions according to claim 1 wherein the perfluoropolyether radicals $R_f$ are selected from:
   (a) $T-O(CF_2CF(CF_3)O)_a(CFXO)_b-$ wherein: X is F or $-CF_3$; a and b are integers such that the molecular weight is comprised in the above range; a/b is in the range 10–100 when b is different from 0, and T is one of the above mentioned end groups;
   (b) $T-O(CF_2CF_2O)_c(CF_2O)_d(CF_2(CF_2)_zCF_2O)_h-$ wherein: c, d and h are integers such that the molecular weight is comprised in the above range; c/d is in the range 0.1–10; h/(c+d) is in the range 0–0.05, z is an integer equal to 2 or 3, and T is one of the above mentioned end groups;
   (c) $T-O(CF_2CF(CF_3)O)_e(CF_2CF_2O)_f(CFXO)_g-$ wherein: X is F or $-CF_3$; e, f, g are integers such that the molecular weight is comprised in the above range; e/(f+g) is in the range 0.1–10, f/g is in the range 2–10, T is one of the above mentioned end groups;
   (d) $T-O(CF_2O)_j(CF_2CF(OR_{f''})O)_k(CF(OR_{f''})O)_l-$ wherein: $R_{f''}$ is $-CF_3$, $-C_2F_5$, $-C_3F_7$; j, k, l are integers such that the molecular weight is comprised in the above range; k+l and j+k+l are at least equal to 2, k/(j+l) is in the range 0.01 and 1000, l/j is comprised between 0.01 and 100; T is one of the above mentioned end groups;
   (e) $T-O-(CF_2(CF_2)_zCF_2O)_s-$ wherein s is an integer such as to give the above molecular weight, z has the above meaning and T is one of the above mentioned end groups;
   (f) $T-O(CR_4R_5CF_2CF_2O)_{j'}-$ wherein $R_4$ and $R_5$ are equal to or different from each other and selected from H, Cl or perfluoroalkyl, j' being an integer such that the molecular weight is that above indicated;
   (g) $T-O(CF(CF_3)CF_2O)_{j''}-$ j'' being an integer such as to give the above molecular weight.

5. Dispersions according to claim 1 wherein in formula (I) $L=CH_2-CH_2$; n ranges from 8 to 12, $R_1=R_2=H$; $R_f$ is a pefluoroalkyl from 5 to 10 carbon atoms, or a perfluoropolyether radical of formula $$R_{f'}-O-(CF_2CF(CF_3)O)_a(CF_2O)_b$$

or $$ClC_3F_6O(CF_2CF(CF_3)O)_a(CF_2O)_b$$

wherein a and b are such that the molecular weight ranges from 500 to 800, and $R_{f'}$ has the above meaning.

6. Dispersions according to claim 1 wherein b) is in the range 0.15–2% by weight, the component c) is in the range 35–55%.

7. Dispersions according to claim 1 wherein a) is a mixture of two or more nonionic hydrogenated surfactants, selected from the following classes:
   alkylphenoxypolyethoxylates having different ratio between the alkylic segment and ethoxylic segment wherein the alkyle ranges from 6 to 15 carbon atoms and the ethoxylic segment ranges from 4 to 20 ethoxylic units;
   polyethoxylated aliphatic alcohols wherein by aliphatic it is meant an alkylic chain from 5 to 20 carbon atoms and the ethoxylated part generally has from 4 to 20 ethoxylic units;
   alkyl substituted oxidized amines.

8. Dispersions according to claim 1 wherein b) is mixed with anionic fluorinated surfactants selected from perfluorocarboxylic acid salts from 5 to 11 carbon atoms; perfluorosulphonic acid salts from 5 to 11 carbon atoms; mono and bi carboxylic acid salts derived from perfluoropolyethers; the ratio by weight between nonionic surfactants and anionic surfactants ranges from 0.1 to 10.

9. Dispersions according to claim 1 wherein the fluoropolymers are selected from polytetrafluoroethylene or tetrafluoroethylene copolymers selected from:

A) modified polytetrafluoroethylene with amounts in the range 0.01–3% by moles of one or more comonomers selected from perfluoropropene, perfluoroalkylperfluorovinylether, chlorotrifluoroethylene, perfluoroalkylethylenes;

B) tetrafluoroethylene thermoplastic copolymers containing from 0.5 to 8% by moles of at least a perfluoroalkylvinylether, where the perfluoroalkylic; TFE amorphous copolymers with fluorodioxoles, wherein the amount of fluorodioxole can range from 40 to 95% moles;

C) tetrafluoroethylene thermoplastic copolymers containing from 2 to 20% by moles of a perfluoroolefin $C_3$–$C_8$, preferably the TFE/hexafluoropropene copolymer, to which amounts lower than 5% by moles of other comonomers having a perfluorovinylether structure can be added;

D) tetrafluoroetilene thermoplastic copolymers containing from 0.5 to 13% by weight of perfluoromethylvinylether and from 0.05 to 5% by weight of one or more fluorinated monomers selected in the group formed by:

1)

(II)

wherein $R_F$ can be:
i) a perfluoroalkylic radical containing from 2 to 12 carbon atoms;
ii)

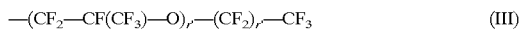
(III)

wherein r is in the range 1–4 and r' is zero or in the range 1–3;
iii)

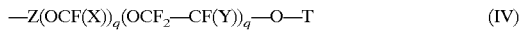
(IV)

wherein the units (OCFX) and ($OCF_2$—CFY) are randomly distributed along the chain; T, X and Y have the same meaning previously defined; Z represents—(CFX)— or —($CF_2$—CFY)—;

q and q', equal to or different from each other, are zero or integers comprised between 1 and 10; the average number molecular weight of the monomer is comprised between 200 and 2,000;

iv)

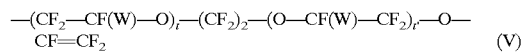
(V)

wherein W is —Cl, —F or —$CF_3$ and t and t' are zero or integers in the range 1–5;

v)

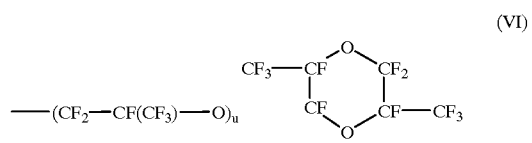
(VI)

wherein u is zero or an integer in the range 1–4;

2)

(VII)

wherein $R_F$ has the meaning described in 1);

3) a perfluporodioxole of formula:

(VIII)

wherein $R_3$ is a perfluoroalkyl radical $C_1$—$C_5$; $X_1$ and $X_2$ are, independently from each other, a fluorine atom or —$CF_3$.

* * * * *